United States Patent
Sakhnini et al.

(10) Patent No.: US 11,996,945 B2
(45) Date of Patent: May 28, 2024

(54) IMPACT OF SYNCHRONIZATION SIGNAL BLOCK ON SEMI-PERSISTENT SCHEDULING HYBRID AUTOMATIC REPEAT REQUEST ACKNOWLEDGEMENT

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/444,514

(22) Filed: Aug. 5, 2021

(65) Prior Publication Data

US 2023/0044718 A1    Feb. 9, 2023

(51) Int. Cl.
*H04L 1/1812*    (2023.01)
*H04L 1/1867*    (2023.01)
(Continued)

(52) U.S. Cl.
CPC .......... *H04L 1/1812* (2013.01); *H04L 1/1896* (2013.01); *H04W 56/001* (2013.01); *H04W 72/04* (2013.01); *H04W 74/0825* (2013.01)

(58) Field of Classification Search
CPC ... H04L 1/1812; H04L 1/1896; H04L 1/0001; H04L 5/00; H04W 56/001; H04W 72/04;
(Continued)

(56) References Cited

U.S. PATENT DOCUMENTS

2020/0236711 A1*  7/2020  Nam ............... H04W 74/0808
2021/0297966 A1*  9/2021  Noh .................. H04W 56/001
(Continued)

FOREIGN PATENT DOCUMENTS

WO   2020154226        7/2020
WO   2021088494 A1     5/2021

OTHER PUBLICATIONS

Catt: "UE Feedback Enhancements for HARQ-ACK", 3GPP TSG RAN WG1 #104-e, R1-2100376, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, 10 Pages, Jan. 19, 2021, XP051970979, p. 4, figure 3, p. 10.

(Continued)

*Primary Examiner* — Ian N Moore
*Assistant Examiner* — Brian T Le
(74) *Attorney, Agent, or Firm* — Harrity & Harrity, LLP

(57) ABSTRACT

Various aspects of the present disclosure generally relate to wireless communication. In some aspects, a user equipment (UE) may receive a semi-persistent scheduling (SPS) downlink communication. The UE may detect a collision between a configured uplink resource associated with a hybrid automatic repeat request acknowledgement (HARQ-ACK) for the SPS downlink communication and a candidate synchronization signal block (SSB) position. The UE may transmit the HARQ-ACK for the SPS downlink communication in the configured uplink resource or in a deferred uplink resource in connection with detecting the collision. Numerous other aspects are described.

30 Claims, 11 Drawing Sheets

(51) Int. Cl.
*H04W 56/00* (2009.01)
*H04W 72/04* (2023.01)
*H04W 74/08* (2009.01)
*H04W 74/0808* (2024.01)

(58) Field of Classification Search
CPC . H04W 74/0825; H04W 16/00; H04W 36/06; H04W 72/12; H04B 7/024
See application file for complete search history.

(56) References Cited

U.S. PATENT DOCUMENTS

2022/0264680 A1* 8/2022 Kim .................. H04W 74/0833
2022/0399978 A1* 12/2022 Gao ..................... H04L 5/0055
2023/0009559 A1* 1/2023 Wang .................. H04B 7/0695

OTHER PUBLICATIONS

International Search Report and Written Opinion—PCT/US2022/073635—ISA/EPO—dated Oct. 19, 2022.
Moderator (Qualcomm Inc): "FL Summary #2 on Duplex Operation for RedCap", 3GPP TSG-RAN WG1 Meeting #104bis-e, Tdoc R1-2103884, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 29 Pages, Apr. 14, 2021, XP051995403, p. 19.

* cited by examiner

IMPACT OF SYNCHRONIZATION SIGNAL BLOCK ON SEMI-PERSISTENT SCHEDULING HYBRID AUTOMATIC REPEAT REQUEST ACKNOWLEDGEMENT

FIELD OF THE DISCLOSURE

Aspects of the present disclosure generally relate to wireless communication and to techniques and apparatuses for reporting semi-persistent scheduling (SPS) hybrid automatic repeat request (HARD) feedback that is impacted by a collision with a candidate synchronization signaling block (SSB) position.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a semi-persistent scheduling (SPS) downlink communication. The one or more processors may be configured to detect a collision between a configured uplink resource associated with a hybrid automatic repeat request acknowledgement (HARQ-ACK) for the SPS downlink communication and a candidate synchronization signal block (SSB) position. The one or more processors may be configured to transmit the HARQ-ACK for the SPS downlink communication in the configured uplink resource or in a deferred uplink resource in connection with detecting the collision.

Some aspects described herein relate to a base station for wireless communication. The base station may include a memory and one or more processors coupled to the memory. The one or more processors may be configured to transmit, to a UE, an SPS downlink communication. The one or more processors may be configured to receive, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource.

Some aspects described herein relate to a method of wireless communication performed by a UE. The method may include receiving an SPS downlink communication. The method may include detecting a collision between a configured uplink resource associated with a HARQ-ACK for the SPS downlink communication and a candidate SSB position. The method may include transmitting the HARQ-ACK for the SPS downlink communication in the configured uplink resource or in a deferred uplink resource in connection with detecting the collision.

Some aspects described herein relate to a method of wireless communication performed by a base station. The method may include transmitting, to a UE, an SPS downlink communication. The method may include receiving, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource.

Some aspects described herein relate to a non-transitory computer-readable medium that stores a set of instructions for wireless communication by a UE. The set of instructions, when executed by one or more processors of the UE, may cause the UE to receive an SPS downlink communication. The set of instructions, when executed by one or more processors of the UE, may cause the UE to detect a collision between a configured uplink resource associated with a HARQ-ACK for the SPS downlink communication and a candidate SSB position. The set of instructions, when executed by one or more processors of the UE, may cause the UE to transmit the HARQ-ACK for the SPS downlink communication in the configured uplink resource or in a deferred uplink resource in connection with detecting the collision.

Some aspects described herein relate to a non-transitory computer-readable medium that stores a set of instructions for wireless communication by a base station. The set of instructions, when executed by one or more processors of the base station, may cause the base station to transmit, to a UE, an SPS downlink communication. The set of instructions, when executed by one or more processors of the base station, may cause the base station to receive, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource.

Some aspects described herein relate to an apparatus for wireless communication. The apparatus may include means for receiving an SPS downlink communication. The apparatus may include means for detecting a collision between a configured uplink resource associated with a HARQ-ACK for the SPS downlink communication and a candidate SSB position. The apparatus may include means for transmitting the HARQ-ACK for the SPS downlink communication in the configured uplink resource or in a deferred uplink resource in connection with detecting the collision.

Some aspects described herein relate to an apparatus for wireless communication. The apparatus may include means for transmitting, to a UE, an SPS downlink communication. The apparatus may include means for receiving, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
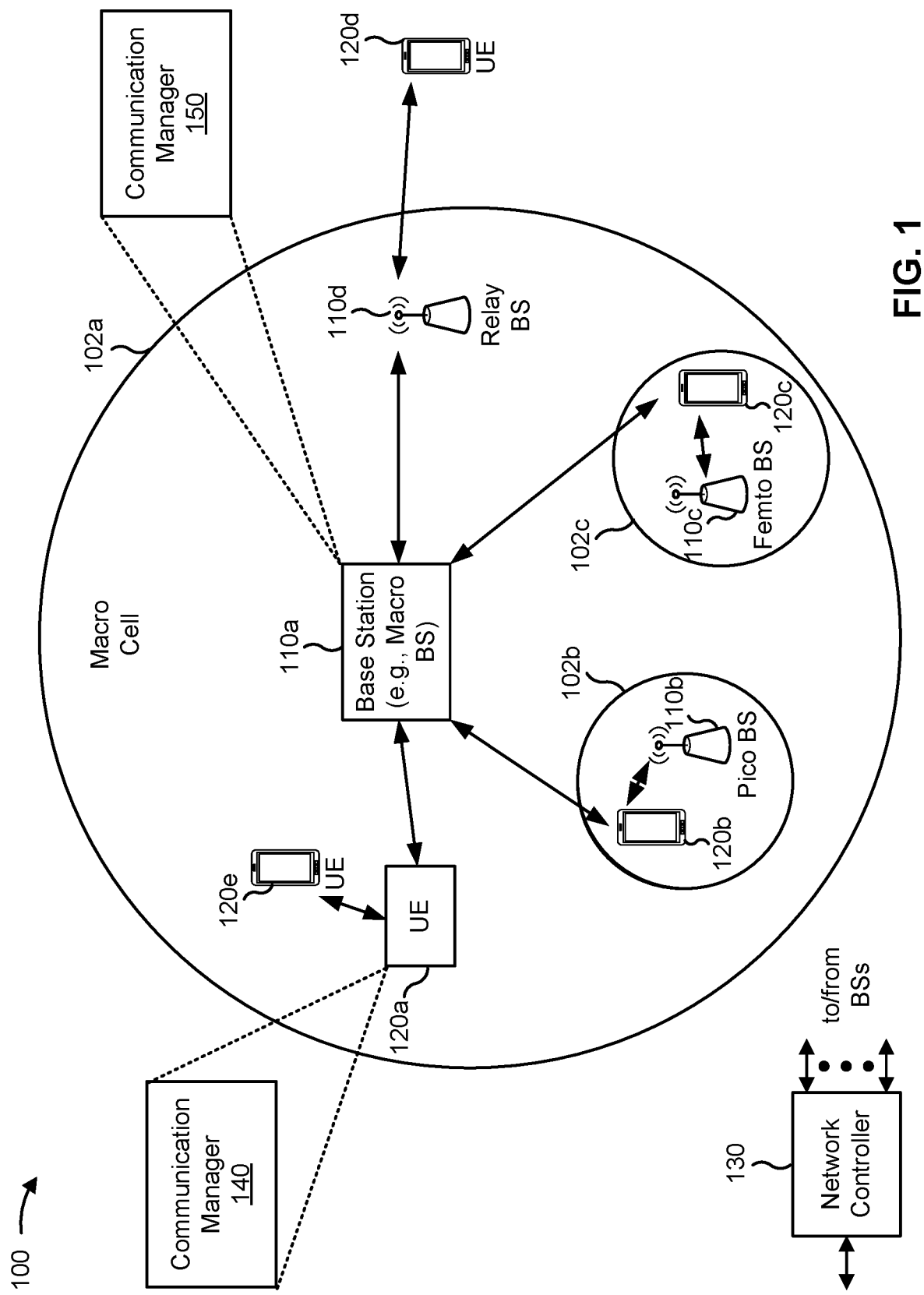
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a semi-persistent scheduling (SPS) downlink communication; detect a collision between a configured uplink resource associated with a hybrid automatic repeat response (HARQ) acknowledgement (HARQ-ACK) for the SPS downlink communication and a candidate synchronization signal block (SSB) position; and transmit the HARQ-ACK for the SPS downlink communication in the configured uplink resource or in a deferred uplink resource in connection with detecting the collision. Additionally, or alternatively, the communication manager 140 may perform one or more other operations described herein.

In some aspects, the base station 110 may include a communication manager 150. As described in more detail elsewhere herein, the communication manager 150 may transmit, to a UE, an SPS downlink communication; and receive, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource. Additionally, or alternatively, the communication manager 150 may perform one or more other operations described herein.

As indicated above, FIG. 1 is provided as an example. Other examples may differ from what is described with regard to FIG. 1.

Figure 2:
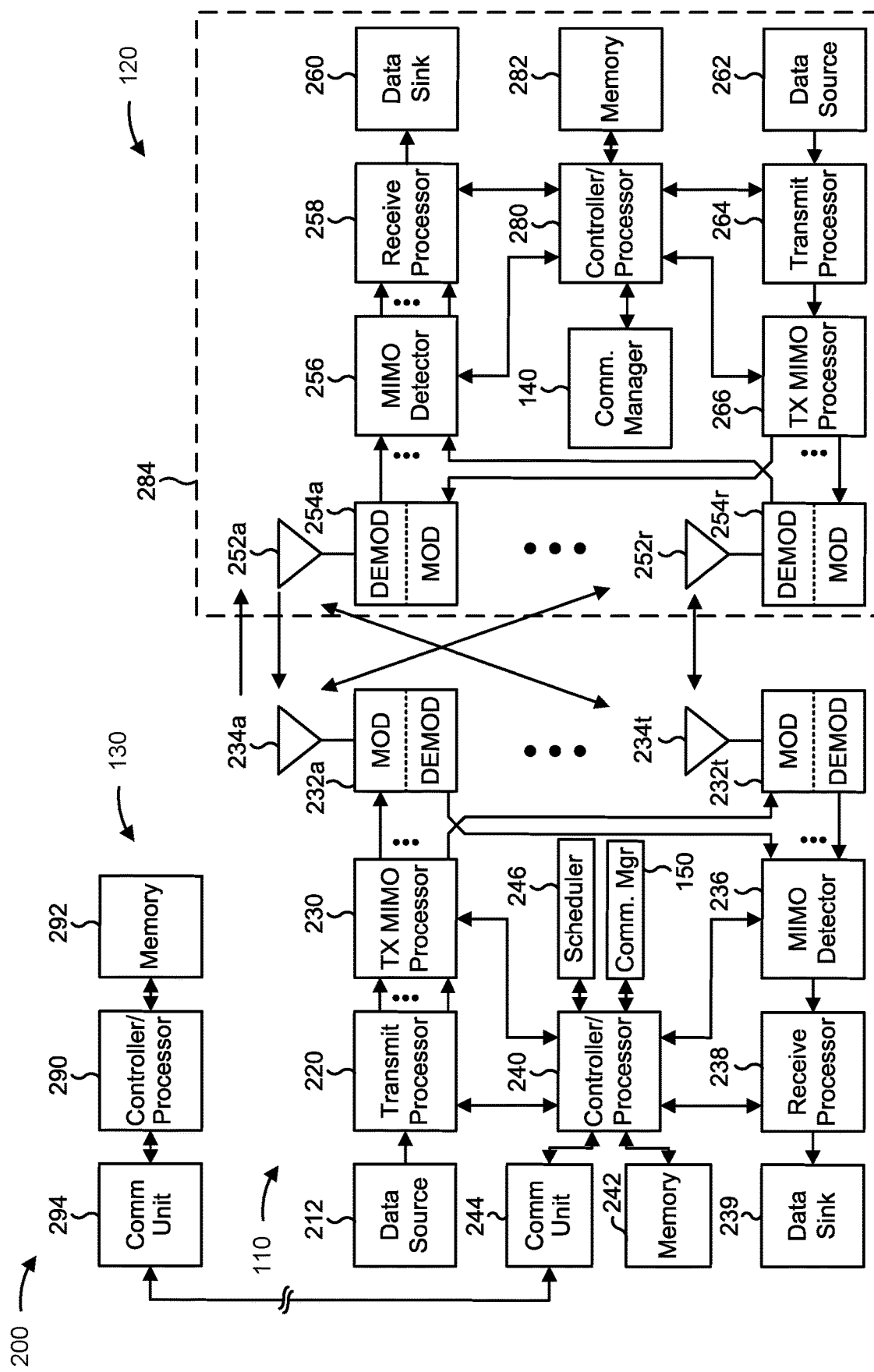
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with reporting SPS HARQ feedback that is impacted by a collision with a candidate SSB position, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving an SPS downlink communication; means for detecting a collision between a configured uplink resource associated with a HARQ-ACK for the SPS downlink communication and a candidate SSB position; and/or means for transmitting the HARQ-ACK for the SPS downlink communication in the configured uplink resource or in a deferred uplink resource in connection with detecting the collision. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, an SPS downlink communication; and/or means for receiving, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
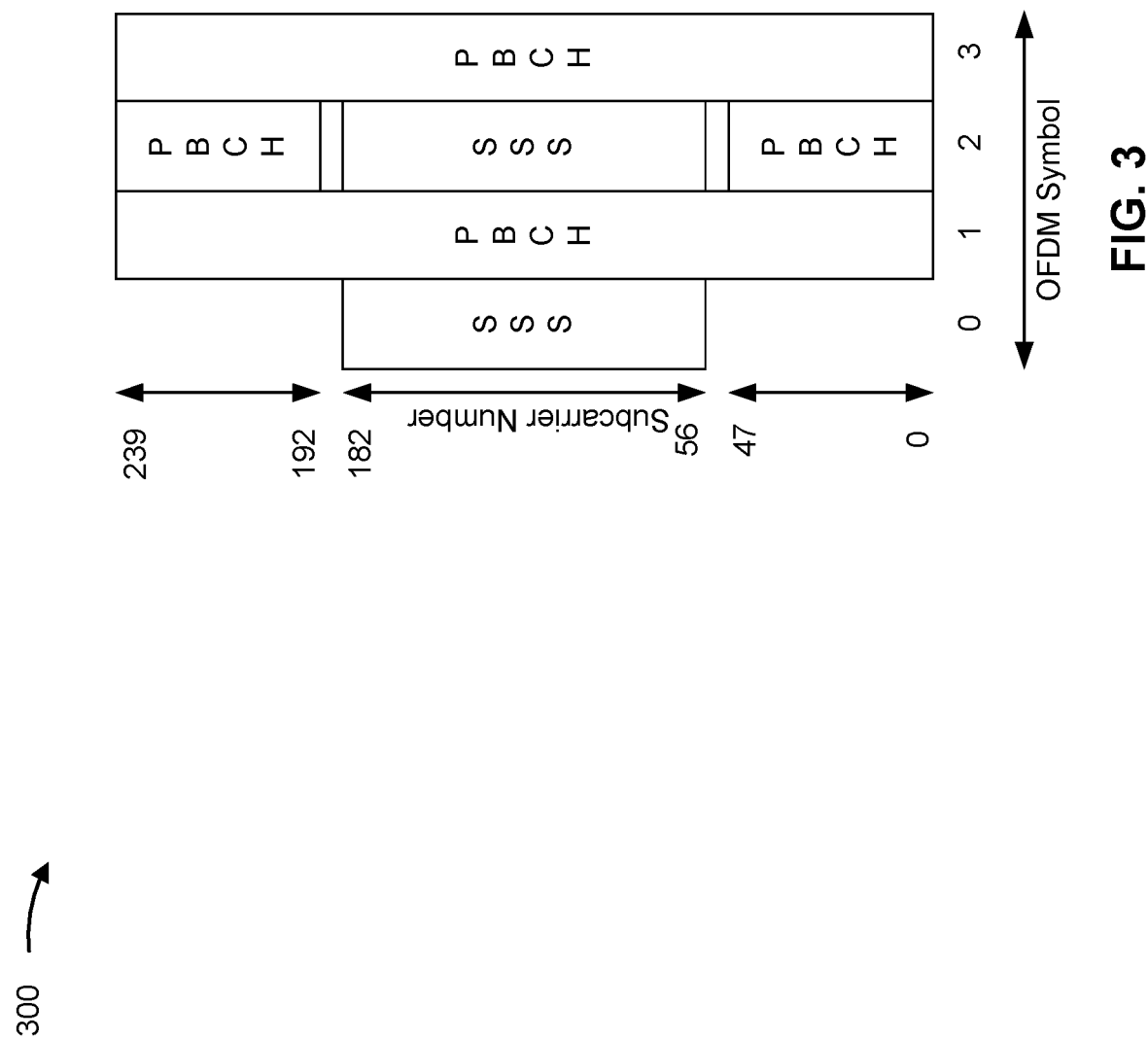
FIG. 3 is a diagram illustrating an example of a synchronization signaling block (SSB), in accordance with the present disclosure.

FIG. 3 is a diagram illustrating an example 300 of an SSB, in accordance with the present disclosure. The SSB shown in example 300 may be an SSB transmitted by a base station with one or more other SSBs in an SSB burst set. An SSB burst set may include one or more SSBs transmitted by a base station. In some examples, different SSBs in an SSB burst set may be beam-formed differently (e.g., transmitted using different beams), and the SSBs may be used for initial cell search, cell acquisition, beam management and/or beam selection (e.g., as part on an initial access procedure). An SSB burst set may be periodically transmitted by a base station. For example, an SSB burst set may have a periodicity of 20 milliseconds (ms). In some examples, an SSB burst set may have a fixed or dynamic duration. For example, transmission of the SSB blocks within an SSB burst set may be confined to within a window of 5 ms according to the 3GPP specification. In some cases, an SSB burst set may be referred to as a discovery reference signal (DRS) transmission window, a discovery burst transmission window, or an SSB measurement time configuration (SMTC) window.

An SSB may include resources that carry a primary synchronization signal (PSS), a secondary synchronization signal (SSS), and/or a physical broadcast channel (PBCH).

As shown in FIG. 3, the SSB may occupy 4 OFDM symbols in the time domain and 240 tones/subcarriers (20 resource blocks) in the frequency domain. Within the SSB, the PSS may occupy 127 tones/subcarriers (12 resource blocks) of the first OFDM symbol of the SSB. The PBCH may fully occupy (20 resource blocks) of the second and fourth OFDM symbols of the SSB. The SSS and the PBCH may be frequency division multiplexed on the third OFDM symbol of the SSB, with the SSB occupying 127 tones/subcarriers (12 resource blocks) of the third OFDM symbol and the PBCH occupying a total of 96 tones/subcarriers (8 resource blocks) above and below the SSS in the third OFDM symbol.

A UE may use the PSS to determine subframe/symbol timing of the base station and to determine a physical layer identity. The UE may use the SSS to determine a physical layer cell identity group number and radio frame timing. The PSS and the SSS may carry a physical cell identifier (PCI). In some case, the PSS may use a length 127 frequency domain-based M-sequence that is mapped to 127 subcarriers. In some examples, the sequence used for the PSS may be selected from three possible sequences (e.g., corresponding to three different groups of PCI values). In some cases, the SSS may use a length 127 frequency domain-based Gold Code sequence (e.g., 2 M-sequences) that is mapped to 127 subcarriers. In some examples, there may be 1008 possible SSS sequences (e.g., three groups of 336 SSS sequences). The PBCH may include PBCH demodulation reference signals (PBCH DMRS) and PBCH data signals. The PBCH may carry a master information block (MIB) that provides system information for initial access (e.g., how to receive remaining minimum system information (RMSI), as well as timing information including an SSB index. In some cases, the PBCH may be quadrature phase shift keying (QPSK) modulated, and the PBCH may be coherently demodulated by a UE using the PBCH DMRS.

In some examples, the SSB index may correspond to a beam used to carry the SSB. A UE may monitor for and/or measure SSBs using different receive (Rx) beams during an initial network access procedure and/or cell search procedure. Based at least in part on the monitoring and/or measuring, the UE may indicate one or more SSBs with a best signal parameter (e.g., an RSRP parameter) to the base station. The base station and the UE may use the one or more indicated SSBs to select one or more beams to be used for communication between the base station and the UE (e.g., for a random access channel (RACH) procedure). Additionally, or alternatively, the UE 120 may use the SSB and/or the SSB index to determine a cell timing for a cell via which the SSB is received (e.g., a serving cell).

In some examples, an SSB and/or an SSB burst set may have different patterns or structures depending on parameters, such as subcarrier spacing (SCS) and frequency range. Different SCS may be used for different operating bands. In some examples, an SCS of 15 kHz or SCS of 30 kHz may be used for FR1, and an SCS of 120 kHz or an SCS of 240 kHz may be used for FR2.

As indicated above, FIG. 3 is provided as an example. Other examples may differ from what is described with respect to FIG. 3.

Figure 4:
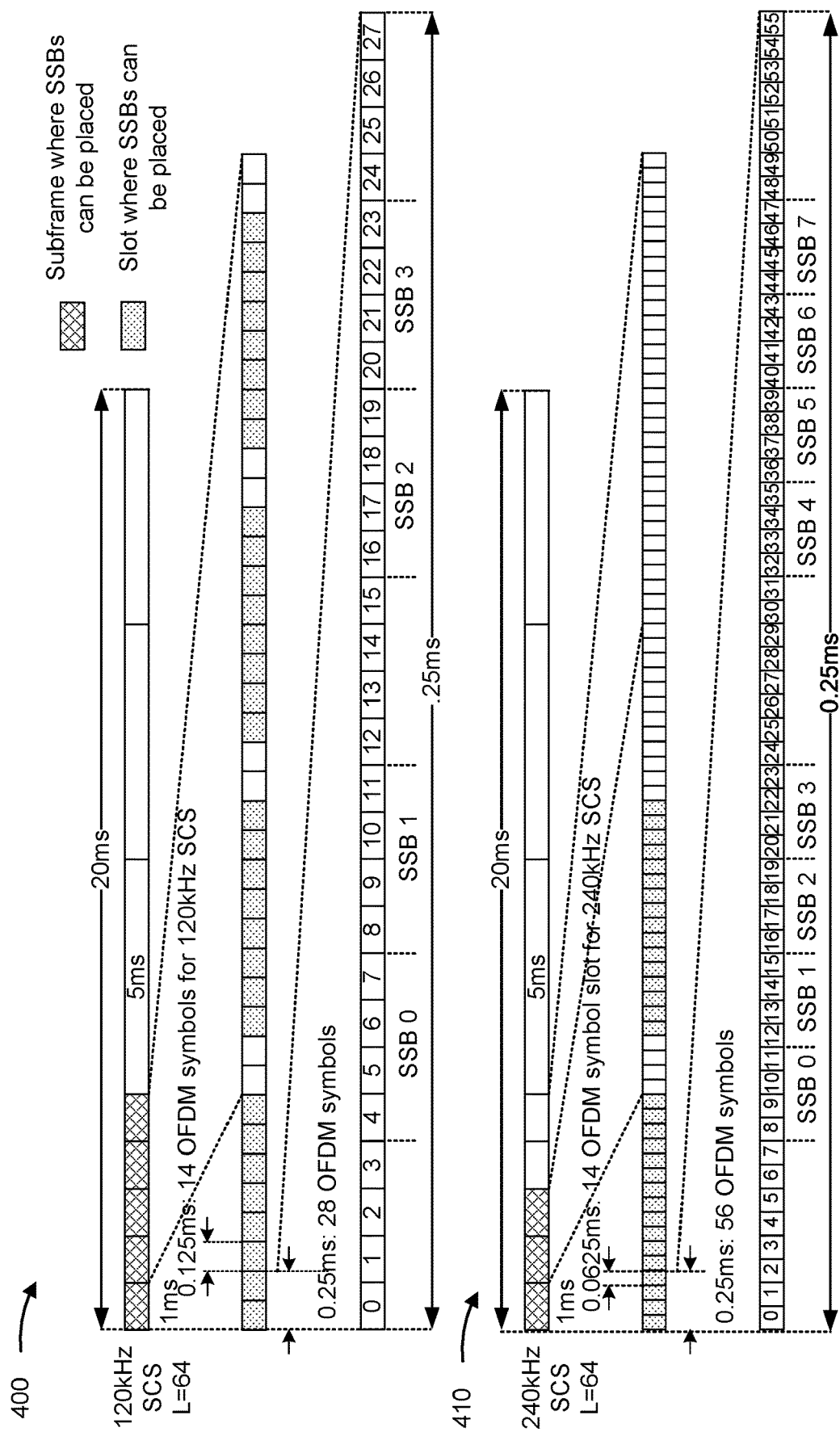
FIG. 4 is a diagram illustrating examples of SSB patterns, in accordance with the present disclosure.

FIG. 4 is a diagram illustrating examples 400 and 410 of SSB patterns, in accordance with the present disclosure. As shown in FIG. 4, example 400 shows a pattern for an SSB burst set for FR2 with 120 kHz SCS, and example 410 shows a pattern for an SSB burst set for FR2 with 240 kHz SCS.

As shown in example 400, in FR2 with 120 kHz SCS, a base station may transmit an SSB burst set within five consecutive 1 ms subframes, and the SSB burst set may have a periodicity of 20 ms. Each subframe may include eight 0.125 ms slots, and each slot may include 14 OFDM symbols. The base station may transmit the SSB burst in four groups of eight consecutive slots within the five subframes in which the SSBs may be transmitted. As shown in example 400, the SSB pattern may include four SSBs (SSB 0, SSB 1, SSB 2, and SSB 3) in 28 OFDM symbols of two consecutive slots (e.g., 0.25 ms). This pattern may be repeated over the 32 slots in which the SSBs of the SSB burst set may be placed, resulting in an SSB burst set with 64 SSB locations in which SSBs may be transmitted (e.g., L=64).

As shown in example 410, in FR2 with 240 kHz SCS, a base station may transmit an SSB burst set within three consecutive 1 ms subframes, and the SSB burst set may have a periodicity of 20 ms. Each subframe may include 16 slots, each with a length of 0.0625 ms, and each slot may include 14 OFDM symbols. The base station may transmit the SSB burst in two groups of 16 consecutive slots within the three subframes in which the SSBs may be transmitted. As shown in example 410, the SSB pattern may include eight SSBs (SSB 0, SSB 1, SSB 2, SSB 3, SSB 4, SSB 5, SSB 6, and SSB 7) in 56 OFDM symbols of four consecutive slots (e.g., 0.25 ms). This pattern may be repeated over the 32 slots in which the SSBs of the SSB burst set may be placed, resulting in an SSB burst set with 64 SSB locations in which SSBs may be transmitted (e.g., L=64).

As indicated above, FIG. 4 is provided as an example. Other examples may differ from what is described with respect to FIG. 4.

Figure 5:
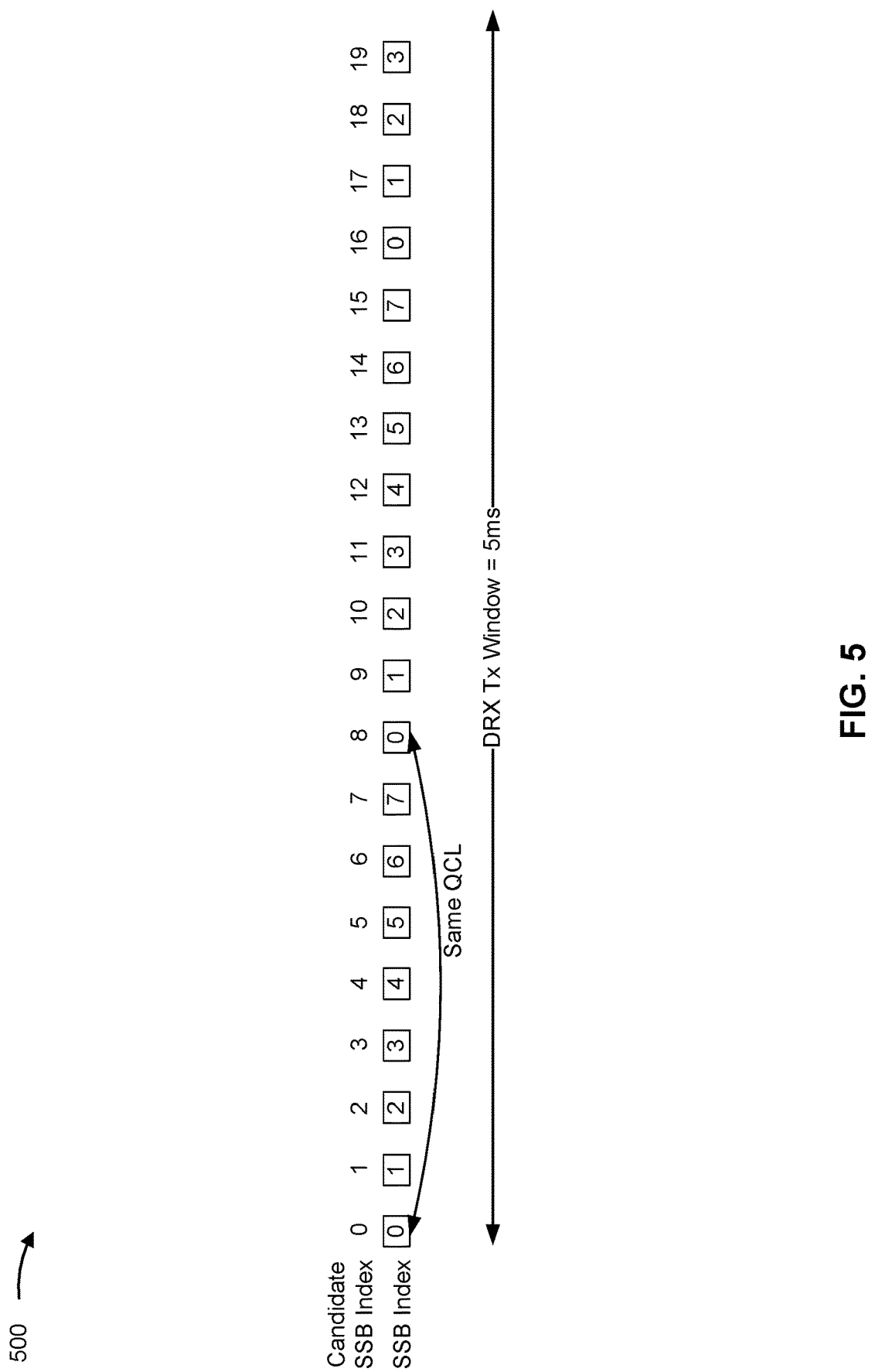
FIG. 5 is a diagram illustrating an example of multiple candidate SSB positions within a discovery reference signal (DRS) transmission window, in accordance with the present disclosure.

FIG. 5 is a diagram illustrating an example 500 of multiple candidate SSB positions within a DRS transmission window, in accordance with the present disclosure.

In some examples, wireless network devices (e.g., base station 110 and UE 120) may operate with shared spectrum channel access. In this case, the wireless network devices may communicate in an unlicensed spectrum (e.g., NR in unlicensed spectrum (NR-U)). For operation with shared spectrum access (e.g., NR-U), a UE may assume that transmissions of SSBs in a half-frame is within a DRS transmission window that start from a first symbol of a first slot in a half-frame. In some examples, the maximum DRS transmission window duration may be 5 ms, and the DRS transmission window duration may be configured as 0.5 ms, 1 ms, 2 ms, 3 ms, 4 ms, or 5 ms. In some examples, if the DRS transmission window duration is not known, a UE may assume that the DRS transmission window has a duration of 5 ms.

In some examples, for FR1, the maximum number of SSBs in a cell may be 8. Each SSB may be associated with a quasi co-location (QCL) that corresponds to a respective beam on which the SSB is transmitted. In order to provide more reliability for SSB delivery in the unlicensed spectrum (e.g., NR-U), multiple candidate SSBs for a certain beam/QCL may be introduced within the DRS transmission window. In this case, each candidate SSB for a certain beam/QCL is a candidate SSB location/position, in the DRS transmission window, for transmitting the SSB associated with that beam/QCL. In some examples, for FR1 NR-U, a maximum number of candidate SSBs within the DRS transmission window may be 10 for SCS=15 kHz and 20 for SCS=30 kHz.

In some examples, multiple candidate SSB positions may be provided for each SSB in the DRS transmission window in order to provide multiple wraparound transmission opportunities for each SSB QCL. In some cases, in order to transmit an SSB in the unlicensed spectrum, a base station may be required to perform a listen-before-talk (LBT) procedure to sense activity on a channel in the unlicensed spectrum prior to transmitting the SSB. For an SSB with a certain QCL, if the LBT fails for transmission of that SSB, the multiple candidate SSB positions for that SSB provide another opportunity for the base station to transmit that SSB in the same DRS transmission window. A UE may be aware of the QCL relationship between SSBs based at least in part on a value ($N_{SSB}^{QCL}$) that indicates a number of candidate SSB positions between repetitions of candidate SSB positions for SSBs with the same SSB index within the DRS Tx window.

As shown in FIG. 5, example 500 shows an example of multiple (e.g., 20) candidate SSB positions within a DRS transmission window for SCS=30 and $N_{SSB}^{QCL}$=8. Each candidate SSB position may be associated with a respective candidate SSB index. Each SSB may be associated with a respective SSB index that index that corresponds to the beam (e.g., QCL) associated with that SSB. For example, the SSB index may be expressed as modulo (PBCH DMRS sequence index, $N_{SSB}^{QCL}$) or modulo (candidate SSB index, $N_{SSB}^{QCL}$). As shown in FIG. 5, the candidate SSB positions for 8 SSBs (e.g., SSB index=0-7) are repeated over the 20 candidate SSB positions. For example, a first candidate SSB position (e.g., candidate SSB index=0), a ninth candidate SSB position (e.g., candidate SSB index=8, and a seventeenth candidate SSB position (e.g., candidate SSB index=16) may provide multiple opportunities for transmission of a first SSB (e.g., SSB index=0) with a first QCL.

In some examples, for a given cell, a UE may assume that that SSBs in the same candidate SSB position within the DRS transmission window are quasi co-located (QCLed) across DRS transmission windows. From the UE's perspective, the number of transmitted SSBs within a DRS transmission window may be no larger than $N_{SSB}^{QCL}$. In some examples, the $N_{SSB}^{QCL}$ range may be {1, 2, 4, 8}, and $N_{SSB}^{QCL}$ may be indicated by the MIB (e.g., for initial access) and/or dedicated radio resource control (RRC) signaling (e.g., for radio resource management (RRM)).

As indicated above, FIG. 5 is provided as an example. Other examples may differ from what is described with respect to FIG. 5.

Figure 6:
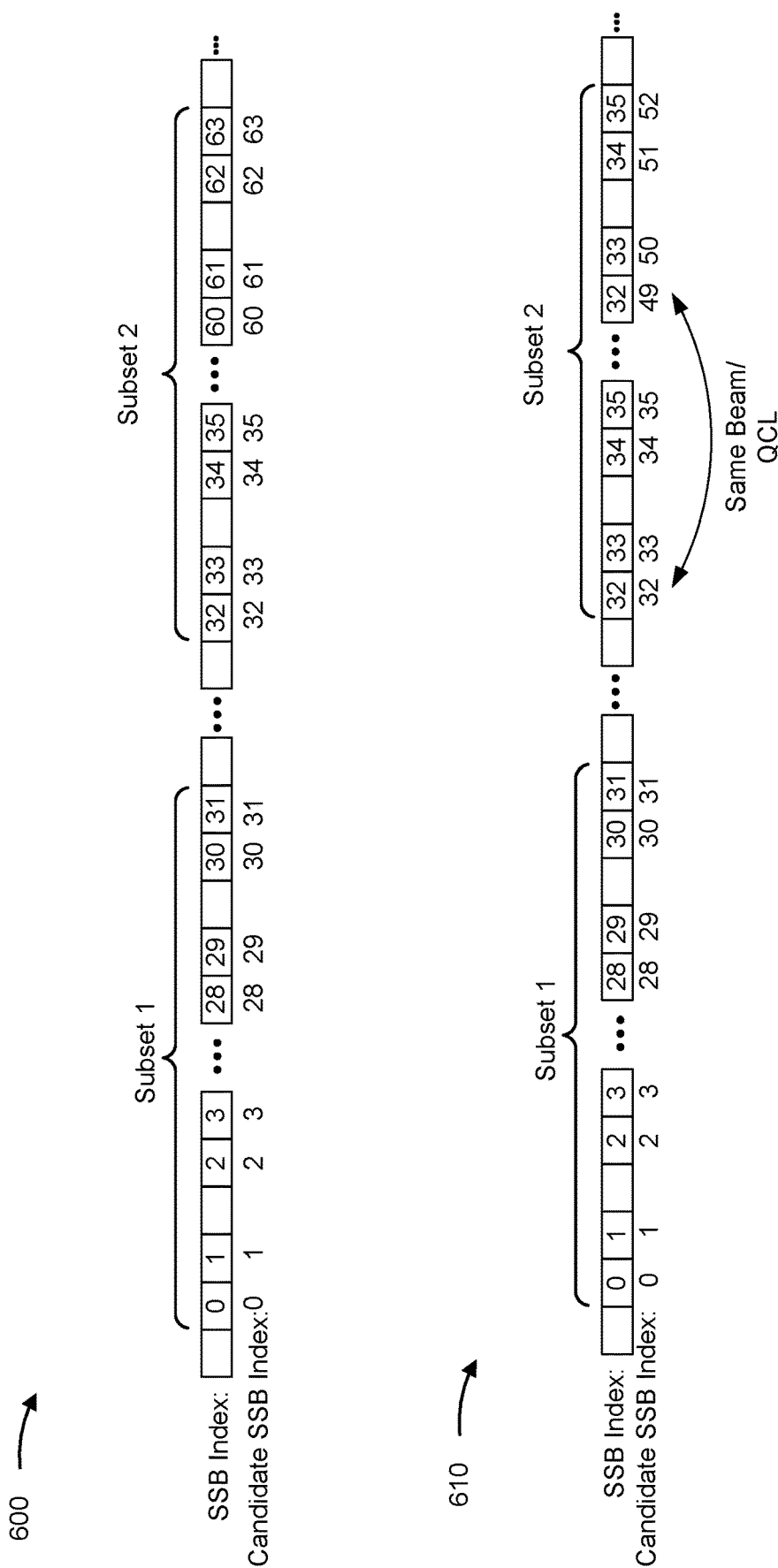
FIG. 6 is a diagram illustrating examples of dividing an SSB burst set into subsets of SSB positions, in accordance with the present disclosure.

FIG. 6 is a diagram illustrating examples 600 and 610 of dividing an SSB burst set into subsets of candidate SSB positions, in accordance with the present disclosure.

In some examples, in FR2 and/or higher frequency bands (e.g., FR4 and/or FR5), a DRS transmission window may include a larger number of candidate SSB positions (e.g., up to 64) and a larger number of SSB beams (e.g., up to 64), as compared with FR1. In some cases, a base station may transmit an SSB on a channel in the unlicensed spectrum without performing channel sensing (e.g., LBT) under the short control signal exemption. The short control signal exemption allows transmission of a signal on a channel in the unlicensed spectrum without channel sensing (e.g., LBT) if the signal is occupying the channel for less than a threshold percentage (e.g., 10%) of a certain time window. In some examples, candidate SSB positions in an SSB burst set (e.g., in a DRS transmission window) may be divided into a first subset of candidate SSB positions for SSB beams that may be transmitted under the short control signal exemption (e.g., without LBT) and a second subset of candidate SSB positions for SSB beams that require channel sensing (e.g., LBT) before transmission.

As shown in FIG. 6, example 600 shows an example of a first subset of candidate SSB positions (Subset 1) for SSB beams that may be transmitted under the short control signal exemption (e.g., without LBT) and a second subset of candidate SSB positions (Subset 2) for SSB beams that require channel sensing (e.g., LBT) before transmission. In example 600, there are 64 total candidate SSB positions in the SSB burst set, with 32 candidate SSB positions in Subset 1 and 32 candidate SSB positions in Subset 2. In some cases, as shown in example 600, for both Subset 1 and Subset 2, one candidate SSB position may be assigned per SSB. For example, as shown in example 600, each of the 32 candidate SSB positions (candidate SSB index 0-31) in Subset 1 is assigned to a respective SSB (SSB index 0-31), and each of the 32 candidate SSB positions (candidate SSB index 32-63) in Subset 2 is assigned to a respective SSB (SSB index 32-63).

As shown in FIG. 6, example 610 shows another example of a first subset of candidate SSB positions (Subset 1) for SSB beams that may be transmitted under the short control signal exemption (e.g., without LBT) and a second subset of candidate SSB positions (Subset 2) for SSB beams that require channel sensing (e.g., LBT) before transmission. In example 610, there are 64 total candidate SSB positions in the SSB burst set, with 32 candidate SSB positions in Subset 1 and 32 candidate SSB positions in Subset 2. In some cases, more than one of the candidate SSB positions can be assigned per SSB. In some cases, as shown in example 610, in Subset 1, each candidate SSB position (candidate SSB index 0-31) may be assigned to a respective SSB (SSB index 0-31), and in Subset 2, multiple candidate positions may be assigned per SSB. For example, as shown in example 610, the candidate SSB positions in Subset 2 may provide multiple transmission opportunities for 4 SSBs (SSB index 32-35), each associated with a respective beam/QCL, that require LBT for transmission.

As indicated above, FIG. 6 is provided as an example. Other examples may differ from what is described with respect to FIG. 6.

In some cases, SPS may be used to allocate periodic resources for downlink transmissions to a UE. For example, a base station may configure a UE with periodically reoccurring SPS physical downlink shared channel (PDSCH) occasions, in which resources are allocated for PDSCH communications to the UE. In this case, the UE may report a HARQ-ACK feedback for each SPS PDSCH occasion in which a PDSCH communication is received from the base station. For example, DCI that activates SPS for the UE may include an indication of a fixed PDSCH-to-HARQ timing value (k1) that indicates an offset between the receiving the SPS PDSCH communication and transmitting the HARQ-ACK for the SPS PDSCH communication. The PDSCH-to-HARQ timing value (k1) may indicate an offset from the downlink resources allocated for the SPS PDSCH communication to pre-configured uplink (e.g., physical uplink control channel (PUCCH)) resources, which the UE may use to transmit the HARQ-ACK. However, for time division duplexing (TDD), if the HARQ-ACK PUCCH resource (e.g., indicated by k1) collides with a downlink symbol or a flexible symbol, the SPS HARQ-ACK may be dropped.

In some examples, a HARQ-ACK for an SPS PDSCH communication may be dropped due to a collision with a candidate DDB position in an SSB burst set. Dropping the HARQ-ACK may lead to unnecessary repetitions of the SPS PDSCH communication. However, in a case in which there are multiple candidate SSB positions assigned per SSB in a SSB burst set (or in a sub-set of an SSB burst set), an actual SSB may or may not be transmitted in a candidate SSB position. In some cases, it may be possible to defer the HARQ-ACK to a future available PUCCH resource. However, because there are no PUCCH HARQ deferral rules for a case in which the PUCCH collides with a candidate SSB position, the base station may not know when to expect the HARQ-ACK from the UE. This may lead to decreased reliability for HARQ feedback to SPS PDSCH communications, which may cause unnecessary repetitions of SPS PDSCH communications. Such unnecessary repetitions of SPS PDSCH communication consume network and computing resources, reduce network speed, and increase traffic latency.

Some techniques and apparatuses described herein enable a UE to receive, from a base station, an SPS downlink communication, detect a collision between a configured uplink resource associated with a HARQ-ACK for the SPS downlink communication and a candidate SSB position, and transmit the HARQ-ACK for the SPS downlink communication in the configured uplink resource or in a deferred uplink resource in connection with detecting the collision. The base station may receive the HARQ-ACK for the SPS downlink communication in the configured uplink resource or in a deferred uplink resource. As a result, reliability of HARQ feedback for SPS downlink communications may be increased and unnecessary dropping of HARQ feedback for SPS downlink communications may be reduced, thus decreasing unnecessary repetitions of the SPS downlink communications. This may result in reduced consumption of network and computing resources, increased network speed, and decreased traffic latency.

Figure 7:
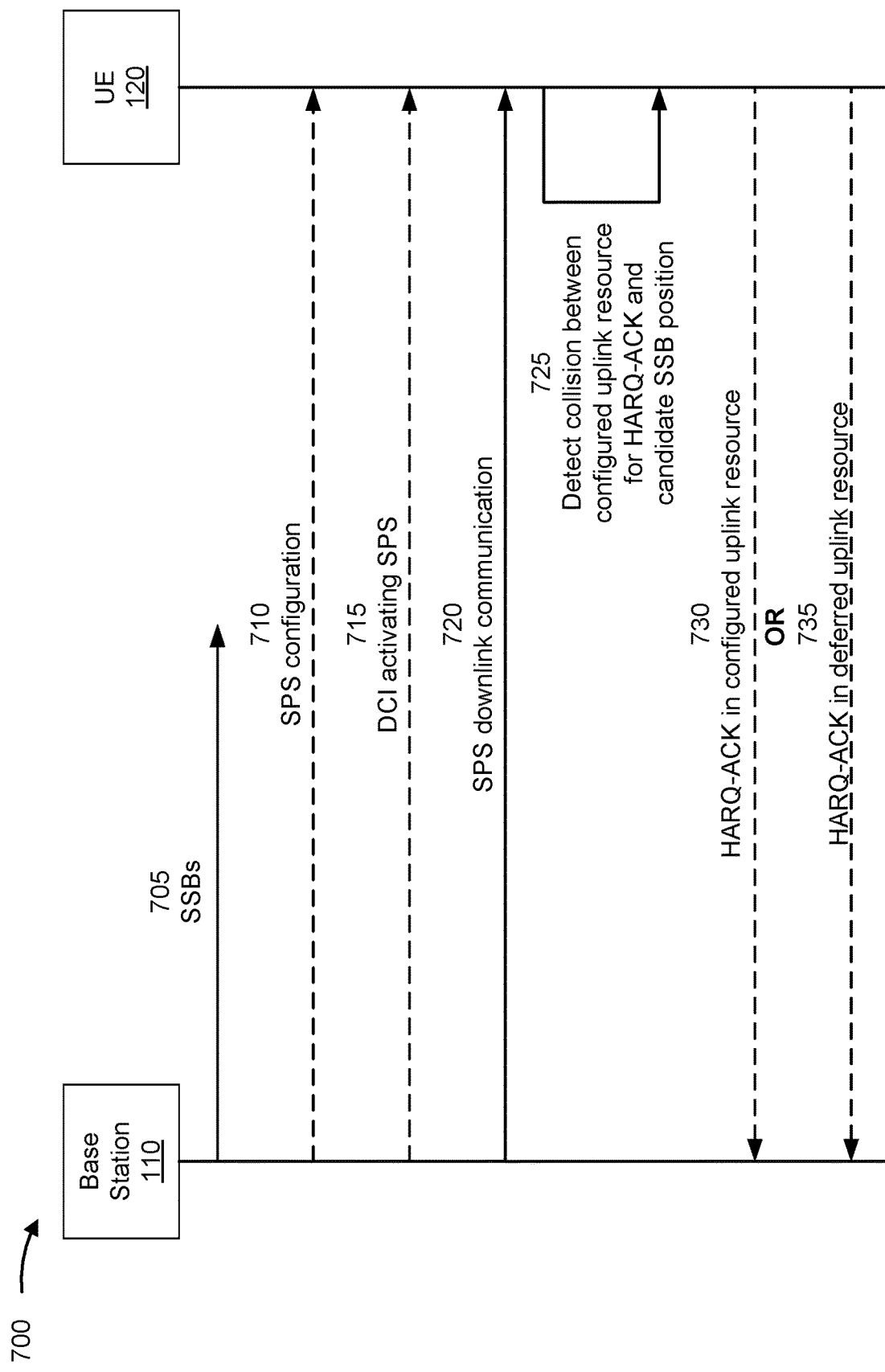
FIG. 7 is a diagram illustrating an example associated with reporting semi-persistent scheduling (SPS) hybrid automatic repeat request (HARQ) feedback that is impacted by a collision with a candidate SSB position, in accordance with the present disclosure.

FIG. 7 is a diagram illustrating an example 700 associated with reporting SPS HARQ feedback that is impacted by a collision with a candidate SSB position, in accordance with the present disclosure. As shown in FIG. 7, example 700 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 7, and by reference number 705, the base station 110 may transmit SSBs in SSB burst sets. In some aspects, each SSB burst set may include multiple candidate SSB positions for one or more of the SSBs. In some aspects, each SSB burst set may include multiple candidate SSB positions for each SSB. In some aspects, each SSB burst set may include a first subset of candidate SSB positions for SSBs that are not subject to LBT and a second subset of candidate SSB positions for SSBs that are subject to LBT. In this case, in the first subset of candidate SSB positions, each of the candidate SSB positions may be assigned to a respective SSB that is not subject to LBT, and the second subset of candidate SSB positions may include multiple candidate SSB positions may include multiple candidate SSB positions per SSB for the SSBs that are subject to LBT. In a SSB burst set with multiple candidate SSB positions for an SSB, the base station 110 may transmit the SSB in any one of the multiple candidate SSB positions for that SSB.

As further shown in FIG. 7, and by reference number 710, the base station 110 may transmit, to the UE 120, an SPS configuration for the UE 120. The UE 120 may receive the SPS configuration. For example, the base station 110 may transmit the SPS configuration to the UE 120 via a an RRC message. The SPS configuration may indicate a resource allocation associated with SPS downlink (e.g., PDSCH) communications and a periodicity at which the resource allocation is repeated, resulting in periodically reoccurring scheduled SPS occasions (e.g., SPS PDSCH occasions) for the UE 120.

As further shown in FIG. 7, and by reference number 715, the base station 110 may transmit, to the UE 120, DCI that activates SPS for the UE 120. For example, the DCI may activate the SPS occasions configured in the SPS configuration for the UE 120. The base station 110 may transmit the DCI that activates SPS to the UE 120 in a PDCCH communication. The UE 120 may receive the DCI that activates SPS, and begin monitoring the SPS occasions configured in the SPS configuration. For example, the UE 120 may monitor the allocated resources for the SPS downlink communications at the allocated periodicity. In some aspects, the DCI that activates SPS may include an indication of a PDSCH-to-HARQ feedback timing value (k1), may provide an offset from an end of the allocated downlink (e.g., PDSCH) resources for receiving an SPS downlink communication to a configured uplink (e.g., PUCCH) associated with a HARQ-ACK for the SPS downlink communication.

As further shown in FIG. 7, and by reference number 720, the UE 120 may receive, from the base station 110, an SPS downlink communication. For example, the base station 110 may transmit, to the UE 120, an SPS downlink communication (e.g., an SPS PDSCH communication) in a SPS occasion configured for the UE 120 in the SPS configuration. The UE 120 may monitor the SPS occasion, based at least in part on receiving the DCI that activates SPS, and the UE 120 may receive the SPS downlink communication transmitted by the base station 110 in the SPS occasion.

As further shown in FIG. 7, and by reference number 725, the UE 120 may detect a collision between a configured uplink resource for the HARQ-ACK for the SPS downlink communication and a candidate SSB position in an SSB burst set. For example, the configured uplink resource for the HARQ-ACK may be an PUCCH resource for transmitting the HARQ-ACK to the base station 110. The UE 120 may identify the configured uplink resource (e.g., PUCCH resource) for the HARQ-ACK for the SPS communication based at least in part on the k1 value, which may be indicated in the DCI that activates SPS for the UE 120. For example, the k1 value may indicate an offset between an end of the SPS downlink (e.g., PDSCH) communication and the configured uplink (e.g., PUCCH) resource for transmitting the HARQ-ACK for the SPS downlink communication. In some aspects, the UE 120 may detect the collision between the uplink resource for the HARQ-ACK and the candidate SSB position based at least in part on a determination that the uplink resource for the HARQ-ACK collides with at least one symbol in the candidate SSB position.

As further shown in FIG. 7, and by reference number 730, in some aspects, the UE 120 may transmit the HARQ-ACK for the SPS downlink communication in the configured uplink resource in connection with detecting the collision between the configured uplink resource for the HARQ-ACK and the candidate SSB position. In this case, the UE 120 may transmit the HARQ-ACK for the SPS downlink communication in the configured uplink resource despite detecting the collision between the configured uplink resource and the candidate SSB position. As further shown in FIG. 7, and by reference number 735, in some aspects, the UE 120 may transmit the HARQ-ACK for the SPS downlink communication in a deferred uplink resource (e.g., a deferred PUCCH resource) in connection with detecting the collision between the configured uplink resource for the HARQ-ACK and the candidate SSB position. In this case, the UE 120 may defer the HARQ-ACK transmission to a later uplink resource (e.g., the deferred uplink resource) in connection with detecting the collision between the configured uplink resource and the candidate SSB position.

In some aspects, the UE 120 may determine whether to transmit the HARQ-ACK in the original configured uplink resource or in the deferred uplink resource in connection with detecting the collision between the configured uplink resource for the HARQ-ACK and the candidate SSB position. In some aspects, the UE 120 may transmit the HARQ-ACK in the deferred uplink resource in any case in which the configured uplink resource for the HARQ-ACK for the SPS downlink communication collides with a candidate SSB position that is not subject to LBT. In this case, the UE 120 may transmit the HARQ-ACK in the deferred uplink resource in connection with a determination that the candidate SSB position is not subject to LBT. For example, the UE 120 may defer the HARQ-ACK transmission in a case in which the candidate SSB position is in the first subset of candidate SSB positions for SSBs that are not subject to LBT, or in a case in which LBT has already been completed and passed before the SSB burst including the candidate SSB position.

In some aspects, the configured uplink resource for the HARQ-ACK for the SPS downlink communication may collide with a candidate SSB position that is subject to LBT. For example, the candidate SSB position may be one or multiple candidate SSB positions available for an SSB/beam in the SSB burst set. In some cases, the complete SSB burst set that includes the candidate SSB position may be subject to LBT. In some cases, the candidate SSB position may be part of a subset of candidate SSB positions that are subject to LBT (e.g., the second subset of candidate SSB positions for SSBs that are subject to LBT). In some aspects, in connection with the detection of a collision between the configured uplink resource for the HARQ-ACK for the SPS downlink communication and a candidate SSB position that is subject to LBT, the UE 120 may select to transmit the HARQ-ACK in the original configured uplink resource or the UE 120 may select to defer the HARQ-ACK to a later uplink resource (e.g., the deferred uplink resource). In some aspects, in a case in which the collision is with a candidate SSB position that is subject to LBT, the UE 120 may be pre-configured (e.g., based at least in part on a wireless communication standard) to transmit the HARQ-ACK for the SPS downlink communication in the original configured uplink resource or the UE 120 may be pre-configured (e.g., based at least in part on a wireless communication standard) to transmit the HARQ-ACK for the SPS downlink communication in the deferred uplink resource. In some aspects, in a case in which the collision is with a candidate SSB position that is subject to LBT, the UE 120 may select between the original configured uplink resource or the deferred uplink resource, for the HARQ-ACK for the SPS downlink communication, based at least in part on signaling and/or configuration from the base station 110.

In some aspects, the UE 120 may determine whether the transmit the HARQ-ACK for the SPS downlink communication in the original configured uplink resource or in the deferred uplink resource based at least in part on an indication received from the base station 110. In some aspects, the base station 110 may transmit the indication to the UE 120 in an RRC configuration message. For example, the indication may be included in the SPS configuration or in another RRC configuration message. In some aspects, the base station 110 may transmit the indication to the UE 120 in the DCI that activates the SPS for the UE 120. In a case in which the indication is included in the SPS configuration or the DCI that activates the SPS, the UE 120 may apply the indication to all collisions detected between uplink resources for HARQ-ACK for SPS downlink communications associated with the active SPS configuration and candidate SSB positions (e.g., candidate SSB positions subject to LBT). In some aspects, the base station 110 may transmit the indication to the UE 120 in a medium access control (MAC) control element (MAC-CE) in a particular SPS occasion. In this case, UE 120 may apply the indication to determine whether to transmit the HARQ-ACK for the SPS communication received in that SPS occasion in the original configured uplink resource or in the deferred uplink resource.

In some aspects, the indication may be general for all SSBs. For example, the indication may be an indication of whether to transmit a HARQ-ACK in the original configured uplink resource or defer the transmission of the HARQ-ACK to a later uplink resource (e.g., the deferred uplink resource) for all cases in which the configured uplink resource for the HARQ-ACK collides with a candidate SSB position (for any SSB) that is subject to LBT. In some aspects, the indication may provide specific indications for one or more SSBs or one or more groups of SSBs. For example, the indication may identify a first set of SSBs for which the UE 120 is to transmit the HARQ-ACK for the SPS downlink communication in the configured uplink resource in connection with detecting the collision and a second set of SSBs for which the UE 120 is to transmit the HARQ-ACK for the SPS downlink communication in the deferred uplink resource in connection with detecting the collision. In this case, in connection with detecting the collision between the configured uplink resource for the HARQ-ACK and the candidate SSB position, the UE 120 may transmit the HARQ-ACK in the original configured uplink resource based at least in part on a determination that the candidate SSB position is for an SSB in the first set of SSBs, or the UE 120 may transmit the HARQ-ACK in the deferred uplink resource based at least in part on a determination that the candidate SSB position is for an SSB in the second set of SSBs.

In some aspects, in a case in which the UE 120 transmits the HARQ-ACK for the SPS downlink communication in the deferred uplink resource, the deferred uplink resource may be an available uplink resource subsequent to the configured uplink resource (e.g., an upcoming PUCCH resource). In some aspects, in a case in which the UE 120 transmits the HARQ-ACK for the SPS downlink communication in the deferred uplink resource, the UE 120 may apply a modified/adjusted k1 value (e.g., an adjusted time offset between the SPS downlink communication and the HARQ-ACK transmission) to determine the deferred PUCCH resource. In this case, the UE 120 may determine the modified/adjusted k1 value based at least in part on a configuration and/or rules that are pre-configured (e.g., based at least in part on a wireless communication standard) or configured by the base station 110. In some aspects, in a case in which the UE 120 transmits the HARQ-ACK for the SPS downlink communication in the deferred uplink resource, the deferred uplink resource may be an uplink resource (e.g., PUCCH resource) in a slot subsequent to the slot associated with the original configured uplink resource for the HARQ-ACK.

As described above, the UE 120 may receive, from the base station 110, an SPS downlink communication. The UE 120 may detect a collision between a configured uplink resource associated with a HARQ-ACK for the SPS downlink communication and a candidate SSB position. The UE 120 may transmit, to the base station 110, the HARQ-ACK for the SPS downlink communication in the configured uplink resource or in a deferred uplink resource in connection with detecting the collision. The base station 110 may receive the HARQ-ACK for the SPS downlink communication in the configured uplink resource or in a deferred uplink resource. As a result, reliability of HARQ feedback for SPS downlink communications may be increased and unnecessary dropping of HARQ feedback for SPS downlink communications may be reduced, thus decreasing unnecessary repetitions of the SPS downlink communications. This may result in reduced consumption of network and computing resources, increased network speed, and decreased traffic latency As indicated above, FIG. 7 is provided as an example. Other examples may differ from what is described with respect to FIG. 7.

Figure 8:
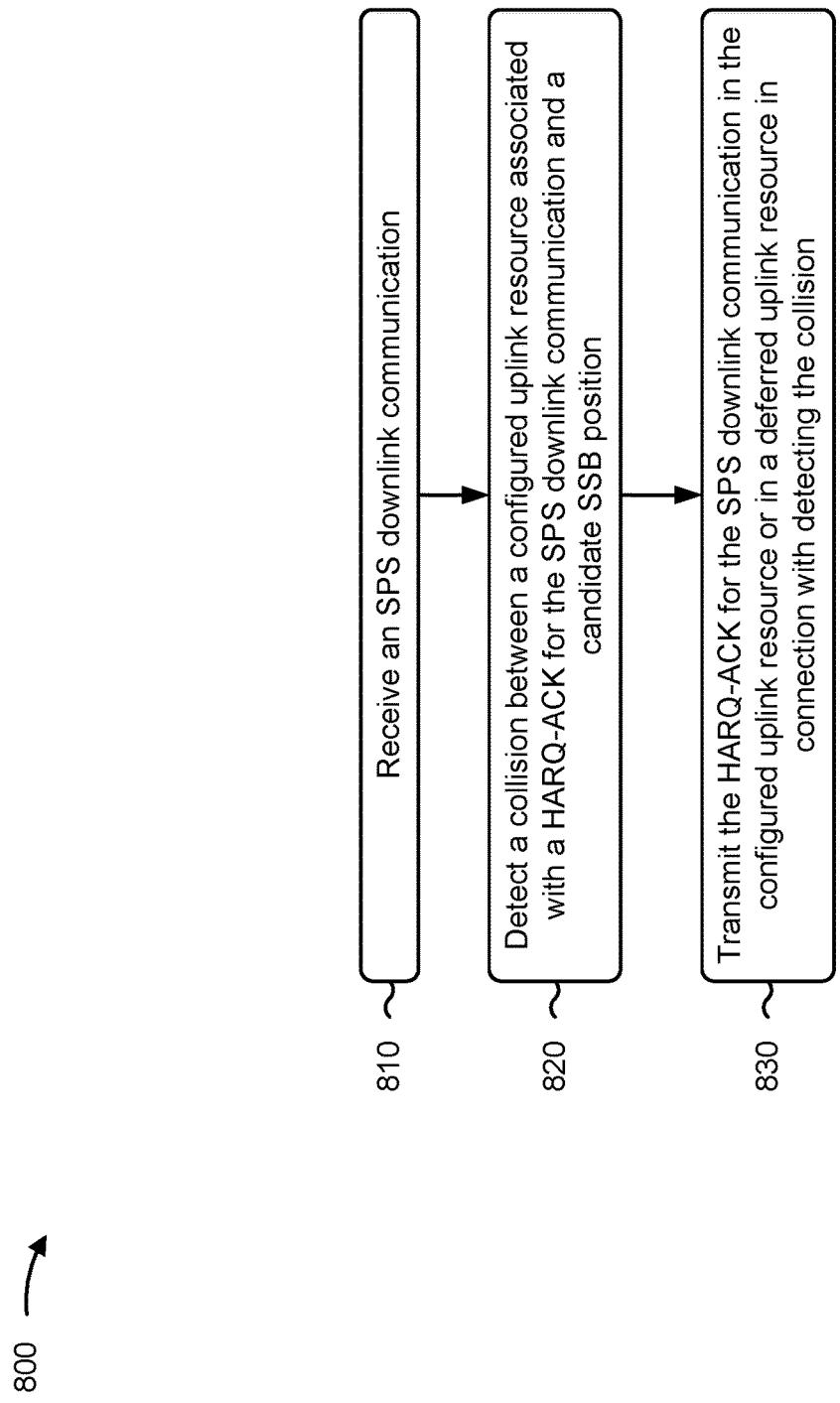
FIGS. 8-9 are diagrams illustrating example processes associated with reporting SPS HARQ feedback that is impacted by a collision with a candidate SSB position, in accordance with the present disclosure.

FIG. 8 is a diagram illustrating an example process 800 performed, for example, by a user equipment (UE), in accordance with the present disclosure. Example process 800 is an example where the UE (e.g., UE 120) performs operations associated with reporting SPS HARQ feedback that is impacted by a collision with a candidate SSB position.

As shown in FIG. 8, in some aspects, process 800 may include receiving an SPS downlink communication (block 810). For example, the UE (e.g., using communication manager 140 and/or reception component 1002, depicted in FIG. 10) may receive an SPS downlink communication, as described above.

As further shown in FIG. 8, in some aspects, process 800 may include detecting a collision between a configured uplink resource associated with a HARQ-ACK for the SPS downlink communication and a candidate synchronization SSB position (block 820). For example, the UE (e.g., using communication manager 140 and/or detection component 1008, depicted in FIG. 10) may detect a collision between a configured uplink resource associated with a HARQ-ACK for the SPS downlink communication and a candidate synchronization SSB position, as described above.

As further shown in FIG. 8, in some aspects, process 800 may include transmitting the HARQ-ACK for the SPS downlink communication in the configured uplink resource or in a deferred uplink resource in connection with detecting the collision (block 830). For example, the UE (e.g., using communication manager 140 and/or transmission component 1004, depicted in FIG. 10) may transmit the HARQ-ACK for the SPS downlink communication in the configured uplink resource or in a deferred uplink resource in connection with detecting the collision, as described above.

Process 800 may include additional aspects, such as any single aspect or any combination of aspects described below and/or in connection with one or more other processes described elsewhere herein.

In a first aspect, transmitting the HARQ-ACK for the SPS downlink communication includes transmitting the HARQ-ACK for the SPS downlink communication in the deferred uplink resource in connection with a determination that the candidate SSB position is for an SSB that is not subject to a listen-before-talk procedure.

In a second aspect, the candidate SSB position is for an SSB that is subject to a listen-before-talk procedure.

In a third aspect, transmitting the HARQ-ACK for the SPS downlink communication includes transmitting the HARQ-ACK for the SPS downlink communication in the configured uplink resource or in the deferred uplink resource based at least in part on an indication received from a base station.

In a fourth aspect, process 800 includes receiving the indication in an RRC message.

In a fifth aspect, process 800 includes receiving the indication in DCI that activates the SPS downlink communication.

In a sixth aspect, process 800 includes receiving the indication in a MAC-CE included in the SPS downlink communication.

In a seventh aspect, the indication identifies a first set of SSBs for which the UE is to transmit the HARQ-ACK for the SPS downlink communication in the configured uplink resource in connection with detecting the collision between the uplink resource and the candidate SSB position, and a second set of SSBs for which the UE is to transmit the HARQ-ACK for the SPS downlink communication in the deferred uplink resource in connection with detecting the collision between the uplink resource and the candidate SSB position.

In an eighth aspect, transmitting the HARQ-ACK for the SPS downlink communication further includes transmitting the HARQ-ACK for the SPS downlink communication in the configured uplink resource based at least in part on a determination that the candidate SSB position is for an SSB in the first set of SSBs, or transmitting the HARQ-ACK for the SPS downlink communication in the deferred uplink resource based at least in part on a determination that the candidate SSB position is for an SSB in the second set of SSBs.

In a ninth aspect, transmitting the HARQ-ACK for the SPS downlink communication includes transmitting the HARQ-ACK for the SPS downlink communication in the deferred uplink resource in connection with detecting the collision, and the deferred uplink resource is an available uplink resource subsequent to the configured uplink resource.

In a tenth aspect, transmitting the HARQ-ACK for the SPS downlink communication includes transmitting the HARQ-ACK for the SPS downlink communication in the deferred uplink resource in connection with detecting the collision, and the deferred uplink resource is an uplink resource associated with an adjusted time offset between the SPS downlink communication and the HARQ-ACK transmission.

In an eleventh aspect, transmitting the HARQ-ACK for the SPS downlink communication includes transmitting the HARQ-ACK for the SPS downlink communication in the deferred uplink resource in connection with detecting the collision, and the deferred uplink resource is an uplink resource in a slot subsequent to a slot associated with the configured uplink resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
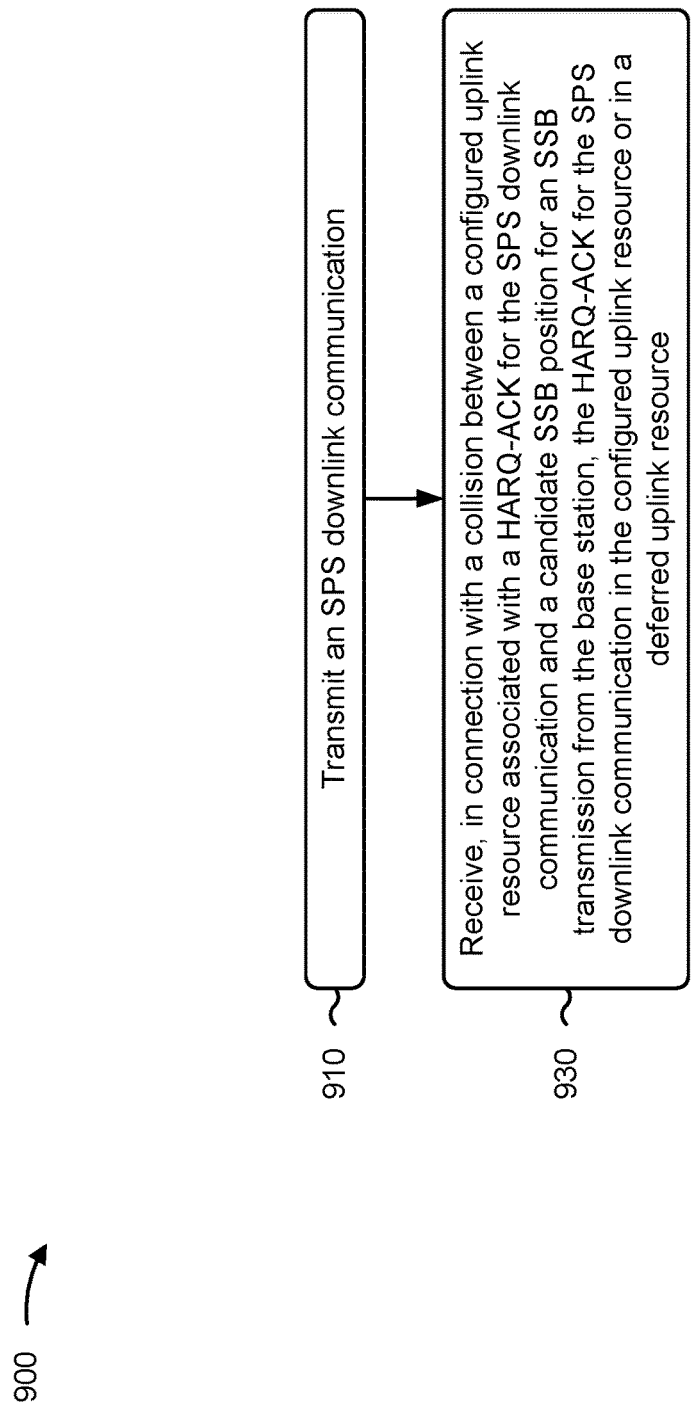

FIG. 9 is a diagram illustrating an example process 900 performed, for example, by a base station, in accordance with the present disclosure. Example process 900 is an example where the base station (e.g., base station 110) performs operations associated with reporting SPS HARQ feedback that is impacted by a collision with a candidate SSB position.

As shown in FIG. 9, in some aspects, process 900 may include transmitting, to a UE, an SPS downlink communication (block 910). For example, the base station (e.g., using communication manager 150 and/or transmission component 1104, depicted in FIG. 11) may transmit, to a UE, an SPS downlink communication, as described above.

As further shown in FIG. 9, in some aspects, process 900 may include receiving, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource (block 920). For example, the base station (e.g., using communication manager 150 and/or reception component 1102, depicted in FIG. 11) may receive, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource, as described above.

Process 900 may include additional aspects, such as any single aspect or any combination of aspects described below and/or in connection with one or more other processes described elsewhere herein.

In a first aspect, receiving the HARQ-ACK for the SPS downlink communication includes receiving the HARQ-ACK for the SPS downlink communication in the deferred uplink resource in connection with a determination that the candidate SSB position is for an SSB that is not subject to a listen-before-talk procedure.

In a second aspect, alone or in combination with the first aspect, the candidate SSB position is for an SSB that is subject to a listen-before-talk procedure.

In a third aspect, alone or in combination with one or more of the first and second aspects, process 900 includes transmitting, to the UE, an indication of whether to transmit the HARQ-ACK for the SPS downlink communication in the configured uplink resource or in the deferred uplink resource.

In a fourth aspect, alone or in combination with one or more of the first through third aspects, transmitting the indication includes transmitting the indication in an RRC configuration message.

In a fifth aspect, alone or in combination with one or more of the first through fourth aspects, transmitting the indication includes transmitting the indication in DCI that activates the SPS downlink communication.

In a sixth aspect, alone or in combination with one or more of the first through fifth aspects, transmitting the indication includes transmitting the indication in a MAC-CE included in the SPS downlink communication.

In a seventh aspect, alone or in combination with one or more of the first through sixth aspects, the indication identifies a first set of SSBs for which the UE is to transmit the HARQ-ACK for the SPS downlink communication in the configured uplink resource in connection with detecting the collision between the uplink resource and the candidate SSB position, and a second set of SSBs for which the UE is to transmit the HARQ-ACK for the SPS downlink communication in the deferred uplink resource in connection with detecting the collision between the uplink resource and the candidate SSB position.

In an eighth aspect, alone or in combination with one or more of the first through seventh aspects, receiving the HARQ-ACK for the SPS downlink communication includes receiving the HARQ-ACK for the SPS downlink communication in the deferred uplink resource, and the deferred uplink resource is an available uplink resource subsequent to the configured uplink resource.

In a ninth aspect, alone or in combination with one or more of the first through eighth aspects, receiving the HARQ-ACK for the SPS downlink communication includes receiving the HARQ-ACK for the SPS downlink communication in the deferred uplink resource, and the deferred uplink resource is an uplink resource associated with an adjusted time offset between the SPS downlink communication and the HARQ-ACK transmission.

In a tenth aspect, alone or in combination with one or more of the first through ninth aspects, receiving the HARQ-ACK for the SPS downlink communication includes receiving the HARQ-ACK for the SPS downlink communication in the deferred uplink resource, and the deferred uplink resource is an uplink resource in a slot subsequent to a slot associated with the configured uplink resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
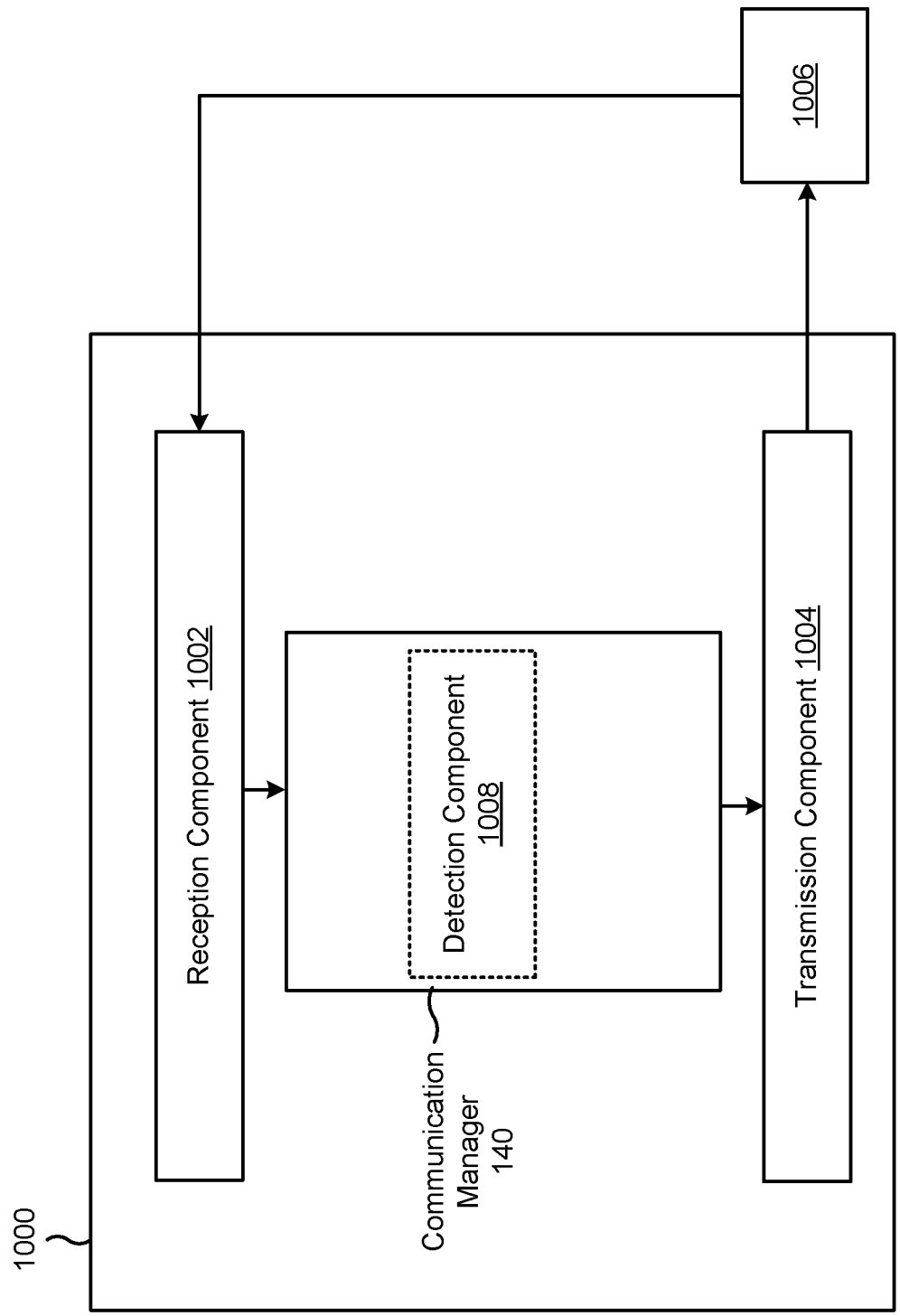
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a detection component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive an SPS downlink communication. The detection component 1008 may detect a collision between a configured uplink resource associated with a HARQ-ACK for the SPS downlink communication and a candidate SSB position. The transmission component 1004 may transmit the HARQ-ACK for the SPS downlink communication in the configured uplink resource or in a deferred uplink resource in connection with detecting the collision.

The reception component 1002 may receive an indication in a radio resource control configuration message.

The reception component 1002 may receive the indication in downlink control information that activates the SPS downlink communication.

The reception component 1002 may receive the indication in a medium access control (MAC) control element (MAC-CE) included in the SPS downlink communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
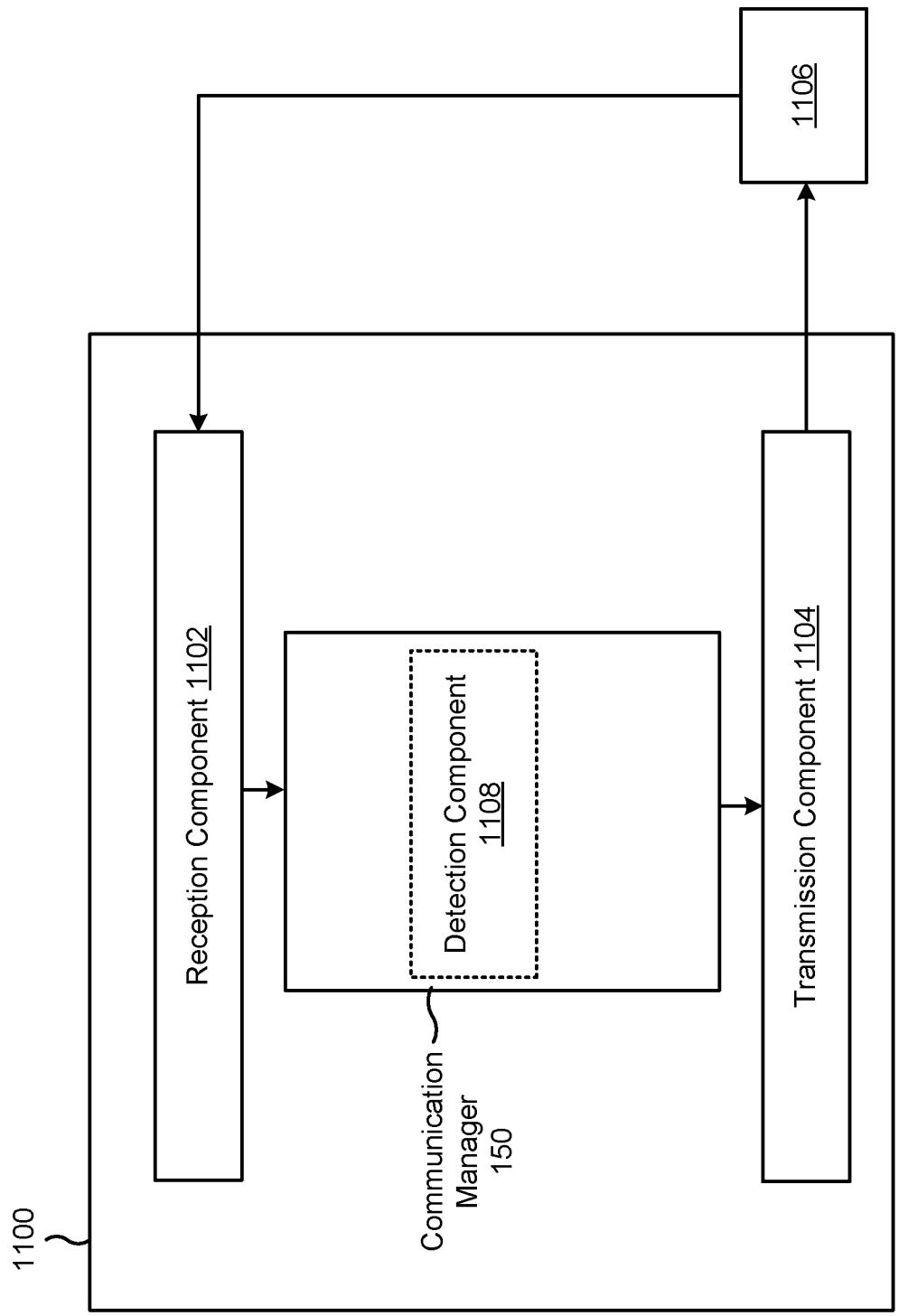

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

As further shown, the apparatus 1100 may include the communication manager 150. The communication manager 150 may include a detection component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, an SPS downlink communication. The reception component 1102 may receive, from the UE and in connection with a collision between a configured uplink resource associated with a HARQ-ACK for the SPS downlink communication and a candidate SSB position for an SSB transmission from the base station, the HARQ-ACK for the SPS downlink communication in the configured uplink resource or in a deferred uplink resource.

The detection component 1108 may detect the collision between the configured uplink resource associated with a HARQ-ACK for the SPS downlink communication and the candidate SSB position.

The transmission component 1104 may transmit, to the UE, an indication of whether to transmit the HARQ-ACK for the SPS downlink communication in the configured uplink resource or in the deferred uplink resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a semi-persistent scheduling (SPS) downlink communication; detecting a collision between a configured uplink resource associated with a hybrid automatic repeat request acknowledgement (HARQ-ACK) for the SPS downlink communication and a candidate synchronization signal block (SSB) position; and transmitting the HARQ-ACK for the SPS downlink communication in the configured uplink resource or in a deferred uplink resource in connection with detecting the collision.

Aspect 2: The method of Aspect 1, wherein transmitting the HARQ-ACK for the SPS downlink communication comprises: transmitting the HARQ-ACK for the SPS downlink communication in the deferred uplink resource in connection with a determination that the candidate SSB position is for an SSB that is not subject to a listen-before-talk procedure.

Aspect 3: The method of Aspect 1, wherein the candidate SSB position is for an SSB that is subject to a listen-before-talk procedure.

Aspect 4: The method of any of Aspects 1 or 3, wherein transmitting the HARQ-ACK for the SPS downlink communication comprises: transmitting the HARQ-ACK for the SPS downlink communication in the configured uplink resource or in the deferred uplink resource based at least in part on an indication received from a base station.

Aspect 5: The method of Aspect 4, further comprising: receiving the indication in a radio resource control configuration message.

Aspect 6: The method of Aspect 4, further comprising: receiving the indication in downlink control information that activates the SPS downlink communication.

Aspect 7: The method of Aspect 4, further comprising: receiving the indication in a medium access control (MAC) control element (MAC-CE) included in the SPS downlink communication.

Aspect 8: The method of any of Aspects 4-7, wherein the indication identifies: a first set of SSBs for which the UE is to transmit the HARQ-ACK for the SPS downlink communication in the configured uplink resource in connection with detecting the collision between the uplink resource and the candidate SSB position, and a second set of SSBs for which the UE is to transmit the HARQ-ACK for the SPS downlink communication in the deferred uplink resource in connection with detecting the collision between the uplink resource and the candidate SSB position.

Aspect 9: The method of Aspect 8, wherein transmitting the HARQ-ACK for the SPS downlink communication further comprises: transmitting the HARQ-ACK for the SPS downlink communication in the configured uplink resource based at least in part on a determination that the candidate SSB position is for an SSB in the first set of SSBs; or transmitting the HARQ-ACK for the SPS downlink communication in the deferred uplink resource based at least in part on a determination that the candidate SSB position is for an SSB in the second set of SSBs.

Aspect 10: The method of any of Aspects 1-9, wherein transmitting the HARQ-ACK for the SPS downlink communication comprises: transmitting the HARQ-ACK for the SPS downlink communication in the deferred uplink resource in connection with detecting the collision, wherein the deferred uplink resource is an available uplink resource subsequent to the configured uplink resource.

Aspect 11: The method of any of Aspects 1-10, wherein transmitting the HARQ-ACK for the SPS downlink communication comprises: transmitting the HARQ-ACK for the SPS downlink communication in the deferred uplink resource in connection with detecting the collision, wherein the deferred uplink resource is an uplink resource associated with an adjusted time offset between the SPS downlink communication and the HARQ-ACK transmission.

Aspect 12: The method of any of Aspects 1-11, wherein transmitting the HARQ-ACK for the SPS downlink communication comprises: transmitting the HARQ-ACK for the SPS downlink communication in the deferred uplink resource in connection with detecting the collision, wherein the deferred uplink resource is an uplink resource in a slot subsequent to a slot associated with the configured uplink resource.

Aspect 13: A method of wireless communication performed by a base station, comprising: transmitting, to a user equipment (UE), a semi-persistent scheduling (SPS) downlink communication; and receiving, from the UE and in connection with a collision between a configured uplink resource associated with a hybrid automatic repeat request acknowledgement (HARQ-ACK) for the SPS downlink communication and a candidate synchronization signal block (SSB) position for an SSB transmission from the base station, the HARQ-ACK for the SPS downlink communication in the configured uplink resource or in a deferred uplink resource.

Aspect 14: The method of Aspect 13, wherein receiving the HARQ-ACK for the SPS downlink communication comprises: receiving the HARQ-ACK for the SPS downlink communication in the deferred uplink resource in connection with a determination that the candidate SSB position is for an SSB that is not subject to a listen-before-talk procedure.

Aspect 15: The method of Aspect 13, wherein the candidate SSB position is for an SSB that is subject to a listen-before-talk procedure.

Aspect 16: The method of any of Aspects 13 or 15, further comprising: transmitting, to the UE, an indication of whether to transmit the HARQ-ACK for the SPS downlink communication in the configured uplink resource or in the deferred uplink resource.

Aspect 17: The method of Aspect 16, wherein transmitting the indication comprises: transmitting the indication in a radio resource control configuration message.

Aspect 18: The method of Aspect 16, wherein transmitting the indication comprises: transmitting the indication in downlink control information that activates the SPS downlink communication.

Aspect 19: The method of Aspect 16, wherein transmitting the indication comprises: transmitting the indication in a medium access control (MAC) control element (MAC-CE) included in the SPS downlink communication.

Aspect 20: The method of any of Aspects 16-19, wherein the indication identifies: a first set of SSBs for which the UE is to transmit the HARQ-ACK for the SPS downlink communication in the configured uplink resource in connection with detecting the collision between the uplink resource and the candidate SSB position, and a second set of SSBs for which the UE is to transmit the HARQ-ACK for the SPS downlink communication in the deferred uplink resource in connection with detecting the collision between the uplink resource and the candidate SSB position.

Aspect 21: The method of any of Aspects 13-20, wherein receiving the HARQ-ACK for the SPS downlink communication comprises: receiving the HARQ-ACK for the SPS downlink communication in the deferred uplink resource, wherein the deferred uplink resource is an available uplink resource subsequent to the configured uplink resource.

Aspect 22: The method of any of Aspects 13-21, wherein receiving the HARQ-ACK for the SPS downlink communication comprises: receiving the HARQ-ACK for the SPS downlink communication in the deferred uplink resource, wherein the deferred uplink resource is an uplink resource associated with an adjusted time offset between the SPS downlink communication and the HARQ-ACK transmission.

Aspect 23: The method of any of Aspects 13-22, wherein receiving the HARQ-ACK for the SPS downlink communication comprises: receiving the HARQ-ACK for the SPS downlink communication in the deferred uplink resource, wherein the deferred uplink resource is an uplink resource in a slot subsequent to a slot associated with the configured uplink resource.

Aspect 24: An apparatus for wireless communication at a device, comprising a processor; memory coupled with the processor; and instructions stored in the memory and executable by the processor to cause the apparatus to perform the method of one or more of Aspects 1-12.

Aspect 25: An apparatus for wireless communication at a device, comprising a processor; memory coupled with the processor; and instructions stored in the memory and executable by the processor to cause the apparatus to perform the method of one or more of Aspects 13-23.

Aspect 26: A device for wireless communication, comprising a memory and one or more processors coupled to the memory, the one or more processors configured to perform the method of one or more of Aspects 1-12.

Aspect 27: A device for wireless communication, comprising a memory and one or more processors coupled to the memory, the one or more processors configured to perform the method of one or more of Aspects 13-23.

Aspect 28: An apparatus for wireless communication, comprising at least one means for performing the method of one or more of Aspects 1-12.

Aspect 29: An apparatus for wireless communication, comprising at least one means for performing the method of one or more of Aspects 13-23.

Aspect 30: A non-transitory computer-readable medium storing code for wireless communication, the code comprising instructions executable by a processor to perform the method of one or more of Aspects 1-12.

Aspect 31: A non-transitory computer-readable medium storing code for wireless communication, the code comprising instructions executable by a processor to perform the method of one or more of Aspects 13-23.

Aspect 32: A non-transitory computer-readable medium storing a set of instructions for wireless communication, the set of instructions comprising one or more instructions that, when executed by one or more processors of a device, cause the device to perform the method of one or more of Aspects 1-12.

Aspect 33: A non-transitory computer-readable medium storing a set of instructions for wireless communication, the set of instructions comprising one or more instructions that, when executed by one or more processors of a device, cause the device to perform the method of one or more of Aspects 13-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors, coupled to the one or more memories, the one or more processors individually or collectively configured to:
        receive an indication identifying a first set of synchronization signal blocks (SSBs) and a second set of SSBs,
            wherein the UE is to transmit a hybrid automatic repeat request acknowledgement (HARQ-ACK) for a semi-persistent scheduling (SPS) downlink communication in a first uplink resource in connection with detecting a first collision between the first uplink resource and a first candidate SSB position associated with the first set of SSBs, and
            wherein the UE is to transmit the HARQ-ACK for the SPS downlink communication in a second uplink resource in connection with detecting a second collision between the first uplink resource and a second candidate SSB position associated with the second set of SSBs;
        receive the SPS downlink communication; and
        transmit the HARQ-ACK for the SPS downlink communication in the first uplink resource based at least in part on detecting the first collision between the first uplink resource and the first candidate SSB position, or in the second uplink resource based at least in part on detecting the second collision between the first uplink resource and the second candidate SSB position.

2. The UE of claim 1, wherein the one or more processors, to transmit the HARQ-ACK for the SPS downlink communication, are individually or collectively configured to:
    transmit the HARQ-ACK for the SPS downlink communication in the second uplink resource in connection with a determination that the second candidate SSB position is for an SSB that is not subject to a listen-before-talk procedure.

3. The UE of claim 1, wherein the second candidate SSB position is for an SSB that is subject to a listen-before-talk procedure.

4. The UE of claim 1, wherein the one or more processors are further configured individually or collectively to:
receive the indication in a radio resource control configuration message.

5. The UE of claim 1, wherein the one or more processors are further configured individually or collectively to:
receive the indication in downlink control information that activates the SPS downlink communication.

6. The UE of claim 1, wherein the one or more processors are further configured individually or collectively to:
receive the indication in a medium access control (MAC) control element (MAC-CE) included in the SPS downlink communication.

7. The UE of claim 1, wherein
the second uplink resource is an available uplink resource subsequent to the first uplink resource.

8. The UE of claim 1, wherein
the second uplink resource is an uplink resource associated with an adjusted time offset between the SPS downlink communication and the HARQ-ACK transmission.

9. The UE of claim 1, wherein
the second uplink resource is an uplink resource in a slot subsequent to a slot associated with the first uplink resource.

10. The UE of claim 1, wherein the one or more processors are further configured individually or collectively to:
detect the first collision between the first uplink resource and the first candidate SSB position.

11. The UE of claim 1, wherein a complete SSB burst set that includes the second candidate SSB position is subject to a listen-before-talk procedure.

12. A network entity for wireless communication, comprising:
one or more memories; and
one or more processors coupled to the one or more memories, the one or more processors individually or collectively configured to:
transmit an indication identifying a first set of synchronization signal blocks (SSBs) and a second set of SSBs,
wherein a user equipment (UE) is to transmit a hybrid automatic repeat request acknowledgement (HARQ-ACK) for a semi-persistent scheduling (SPS) downlink communication in a first uplink resource in connection with detecting a first collision between the first uplink resource and a first candidate SSB position associated with the first set of SSBs, and
wherein the UE is to transmit the HARQ-ACK for the SPS downlink communication in a second uplink resource in connection with detecting a second collision between the first uplink resource and a second candidate SSB position associated with the second set of SSBs;
transmit, to the UE, the SPS downlink communication; and
receive, from the UE, the HARQ-ACK for the SPS downlink communication in the first uplink resource based at least in part on detecting the first collision between the first uplink resource and the first candidate SSB position, or in the second uplink resource based at least in part on detecting the second collision between the first uplink resource and the second candidate SSB position.

13. The network entity of claim 12, wherein the one or more processors, to receive the HARQ-ACK for the SPS downlink communication, are individually or collectively configured to:
receive the HARQ-ACK for the SPS downlink communication in the second uplink resource in connection with a determination that the second candidate SSB position is for an SSB that is not subject to a listen-before-talk procedure.

14. The network entity of claim 12, wherein the indication indicates whether to transmit the HARQ-ACK for the SPS downlink communication in the first uplink resource or in the second uplink resource.

15. The network entity of claim 12, wherein the one or more processors, to transmit the indication, are individually or collectively configured to:
transmit the indication in at least one of radio resource control configuration message, downlink control information that activate the SPS downlink communication, or a medium access control (MAC) control element (MAC-CE) included in the SPS downlink communication.

16. The network entity of claim 12, wherein
the second uplink resource is at least one of an available uplink resource subsequent to the first uplink resource, an uplink resource associated with an adjusted time offset between the SPS downlink communication and the HARQ-ACK transmission, or an uplink resource in a slot subsequent to a slot associated with the first uplink resource.

17. The network entity of claim 12, wherein the complete SSB burst set that includes the second candidate SSB position is subject to a listen-before-talk procedure.

18. A method of wireless communication performed by a user equipment (UE), comprising:
receiving an indication identifying a first set of synchronization signal blocks (SSBs) and a second set of SSBs,
wherein the UE is to transmit a hybrid automatic repeat request acknowledgement (HARQ-ACK) for a semi-persistent scheduling (SPS) downlink communication in a first uplink resource in connection with detecting a first collision between the first uplink resource and a first candidate SSB position associated with the first set of SSBs, and
wherein the UE is to transmit the HARQ-ACK for the SPS downlink communication in a second uplink resource in connection with detecting a second collision between the first uplink resource and a second candidate SSB position associated with the second set of SSBs;
receiving the SPS downlink communication; and
transmitting the HARQ-ACK for the SPS downlink communication in the first uplink resource based at least in part on detecting the first collision between the first uplink resource and the first candidate SSB position, or in the second uplink resource based at least in part on detecting the second collision between the first uplink resource and the second candidate SSB position.

19. The method of claim 18, wherein transmitting the HARQ-ACK for the SPS downlink communication comprises:
transmitting the HARQ-ACK for the SPS downlink communication in the second uplink resource in connection with a determination that the second candidate SSB position is for an SSB that is not subject to a listen-before-talk procedure.

20. The method of claim 18, wherein transmitting the HARQ-ACK for the SPS downlink communication comprises:
    transmitting the HARQ-ACK for the SPS downlink communication in the first uplink resource or in the second uplink resource based at least in part on the indication received from network entity.

21. The method of claim 20, further comprising:
    receiving the indication in at least one of a radio resource control configuration message, downlink control information that activates the SPS downlink communication, or a medium access control (MAC) control element (MAC-CE) included in the SPS downlink communication.

22. The method of claim 18, wherein
    the second uplink resource is at least one of an available uplink resource subsequent to the first uplink resource, an uplink resource associated with an adjusted time offset between the SPS downlink communication and the HARQ-ACK transmission, or an uplink resource in a slot subsequent to a slot associated with the first uplink resource.

23. The method of claim 18, further comprising:
    detecting the first collision between the first uplink resource and the first candidate SSB position.

24. The method of claim 18, wherein a complete SSB burst set that includes the second candidate SSB position is subject to a listen-before-talk procedure.

25. A method of wireless communication performed by a network entity, comprising:
    transmitting an indication identifying a first set of synchronization signal blocks (SSBs) and a second set of SSBs,
        wherein a user equipment (UE) is to transmit a hybrid automatic repeat request acknowledgement (HARQ-ACK) for a semi-persistent scheduling (SPS) downlink communication in a first uplink resource in connection with detecting a first collision between the first uplink resource and a first candidate SSB position associated with the first set of SSBs, and
        wherein the UE is to transmit the HARQ-ACK for the SPS downlink communication in a second uplink resource in connection with detecting a second collision between the first uplink resource and a second candidate SSB position associated with the second set of SSBs;
    transmitting, to the (UE), the SPS downlink communication; and
    receiving, from the UE, the HARQ-ACK for the SPS downlink communication in the first uplink resource based at least in part on detecting the first collision between the first uplink resource and the first candidate SSB position, or in the second uplink resource based at least in part on detecting the second collision between the first uplink resource and the second candidate SSB position.

26. The method of claim 25, wherein the indication indicates whether to transmit the HARQ-ACK for the SPS downlink communication in the first uplink resource or in the second uplink resource.

27. The method of claim 25, wherein transmitting the indication comprises:
    transmitting the indication in at least one of a radio resource control configuration message, downlink control information that activates the SPS downlink communication, or a medium access control (MAC) control element (MAC-CE) included in the SPS downlink communication.

28. The method of claim 25, wherein
    the second uplink resource is at least one of an available uplink resource subsequent to the first uplink resource, an uplink resource associated with an adjusted time offset between the SPS downlink communication and the HARQ-ACK transmission, or an uplink resource in a slot subsequent to a slot associated with the first uplink resource.

29. The method of claim 25, wherein the second uplink resource is at least one of an available uplink resource subsequent to the first uplink resource, an uplink resource associated with an adjusted time offset between the SPS downlink communication and the HARQ-ACK transmission, or an uplink resource in a slot subsequent to a slot associated with the first uplink resource.

30. The method of claim 25, wherein a complete SSB burst set that includes the second candidate SSB position is subject to a listen-before-talk procedure.

* * * * *